United States Patent
Yang et al.

(10) Patent No.: US 10,187,511 B2
(45) Date of Patent: Jan. 22, 2019

(54) MOBILE TERMINAL AND CONTROL METHOD THEREFOR

(71) Applicant: LG ELECTRONICS INC., Seoul (KR)

(72) Inventors: Eunho Yang, Seoul (KR); Hyunjong Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 15/548,716

(22) PCT Filed: Sep. 7, 2015

(86) PCT No.: PCT/KR2015/009406
§ 371 (c)(1),
(2) Date: Aug. 3, 2017

(87) PCT Pub. No.: WO2016/125971
PCT Pub. Date: Aug. 11, 2016

(65) Prior Publication Data
US 2018/0034954 A1    Feb. 1, 2018

(30) Foreign Application Priority Data

Feb. 3, 2015  (KR) .................. 10-2015-0016639

(51) Int. Cl.
| | |
|---|---|
| *H04M 1/72* | (2006.01) |
| *H04B 1/38* | (2015.01) |
| *G06F 1/16* | (2006.01) |
| *G06F 3/01* | (2006.01) |
| *G06F 3/041* | (2006.01) |

(Continued)

(52) U.S. Cl.
CPC ........ *H04M 1/72569* (2013.01); *G06F 1/163* (2013.01); *G06F 3/017* (2013.01);
(Continued)

(58) Field of Classification Search
CPC ........ H04M 1/72569; H04M 1/72527; H04M 2250/12; H04M 1/7253; H04M 1/67;
(Continued)

(56) References Cited

U.S. PATENT DOCUMENTS 9,793,981 B2 * 10/2017 Lee .................. G06F 1/1694
2005/0198029 A1 * 9/2005 Pohja .................. H04W 76/10
(Continued)

FOREIGN PATENT DOCUMENTS

| | | |
|---|---|---|
| KR | 1020140113118 | 9/2014 |
| WO | 2014171734 | 10/2014 |

OTHER PUBLICATIONS

PCT International Application No. PCT/KR2015/009406, Written Opinion of the International Searching Authority dated Dec. 9, 2015, 18 pages.

*Primary Examiner* — Pablo Tran
(74) *Attorney, Agent, or Firm* — Lee, Hong, Degerman, Kang & Waimey

(57) ABSTRACT

The present invention provides a mobile terminal and a control method using an intuitive gesture as an input to perform a function. Specifically, the present invention provides a mobile terminal including a sensing unit for sensing movement of the mobile terminal, a wireless communication unit for transmitting/receiving a radio signal to/from an external terminal and a control unit for sensing a distance from the mobile terminal to the external terminal based on the strength of the received radio signal, and performing a specific function when the sensed movement corresponds to specific movement and the sensed distance is within a specific range.

20 Claims, 15 Drawing Sheets

(51) Int. Cl.
*H04M 1/725* (2006.01)
*G06F 3/0488* (2013.01)

(52) U.S. Cl.
CPC ........ *G06F 3/04883* (2013.01); *H04M 1/725* (2013.01); *H04M 1/72527* (2013.01); *G06F 3/0416* (2013.01); *G06F 2203/0384* (2013.01); *H04M 2250/12* (2013.01)

(58) Field of Classification Search
CPC .............. H04M 2250/22; G06F 3/0416; G06F 1/1694; G06F 1/3215; G06F 3/017; G06F 3/0346; G06F 1/1626; G06F 1/163; G06F 2200/1614; G06F 2200/1636; G06F 2200/1637; G06F 1/3206; H04B 7/26; H04B 1/385; H04B 1/3833
See application file for complete search history.

(56) References Cited

U.S. PATENT DOCUMENTS

| | | | |
|---|---|---|---|
| 2006/0256074 A1 | 11/2006 | Krum et al. | |
| 2006/0282021 A1* | 12/2006 | Devaul | A61B 5/0024 600/595 |
| 2011/0004436 A1 | 1/2011 | Beute | |
| 2011/0106954 A1* | 5/2011 | Chatterjee | G06F 1/1632 709/227 |
| 2011/0314153 A1* | 12/2011 | Bathiche | H04L 63/08 709/225 |
| 2012/0050153 A1* | 3/2012 | Dvortsov | H04W 12/04 345/156 |
| 2012/0306745 A1 | 12/2012 | Moore et al. | |
| 2013/0057496 A1* | 3/2013 | Hong | G06F 3/0488 345/173 |

* cited by examiner

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/009406, filed on Sep. 7, 2015, which claims the benefit of Korean Patent Application No. 10-2015-0016639, filed Feb. 3, 2015, the contents of which are all hereby incorporated by reference herein in their entirety.

FIELD OF THE INVENTION

The present invention relates to a mobile terminal and control method thereof, suitable for enabling implementation of a terminal use in further consideration of user's convenience.

RELATED ART

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be embodied into a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Recently, types of mobile terminals are diversified, and more particularly, a shape wearable on user's body among the various types receives attention. Since a size of a display cannot help decreasing due to a fact that a mobile terminal should be worn on user's body, it is possible that manipulation of this mobile terminal may be more difficult than that of a mobile terminal of another type. Particularly, when an input (e.g., password input) for which security is required is applied, it causes a problem that such an input is possibly exposed around a user. Thus, the demand for the study on a method of controlling a wearable device to solve the above problem is rising.

DETAILED DISCLOSURE

Technical Task

Accordingly, the present invention is directed to substantially obviate one or more problems due to limitations and disadvantages of the related art. One technical task of the present invention is to provide a wearable type mobile terminal and controlling method thereof, by which a control of the mobile terminal is facilitated.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a mobile terminal, including a sensing unit configured to sense a motion of the mobile terminal, a wireless communication unit configured to transceive a wireless signal with an external terminal, and a controller configured to sense a distance from the external terminal based on strength of the received wireless signal and perform a prescribed function if the sensed motion corresponds to a prescribed motion in a state that the sensed distance is within a prescribed distance.

In another technical aspect of the present invention, provided herein is a method of controlling a mobile terminal, including sensing a motion of the mobile terminal, transceiving a wireless signal with an external terminal, and sensing a distance from the external terminal based on strength of the received wireless signal and perform a prescribed function if the sensed motion corresponds to a prescribed motion in a state that the sensed distance is within a prescribed distance.

Advantageous Effects

Effects of a mobile terminal and controlling method thereof according to the present invention are described as follows.

According to at least one of embodiments of the present invention, by linking a wearable terminal with a mobile terminal of a different type, a user input means having enhanced convenience can be provided.

Additional range of applicability of the present invention will become clear from the detailed description of the invention in the following. Yet, since it will be apparent to those skilled in the art that various modifications and variations can be made therein without departing from the spirit and scope of the invention, it is to be understood that the following detailed description of the present invention and a specific embodiment such as a preferred embodiment of the present invention are exemplary and explanatory.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
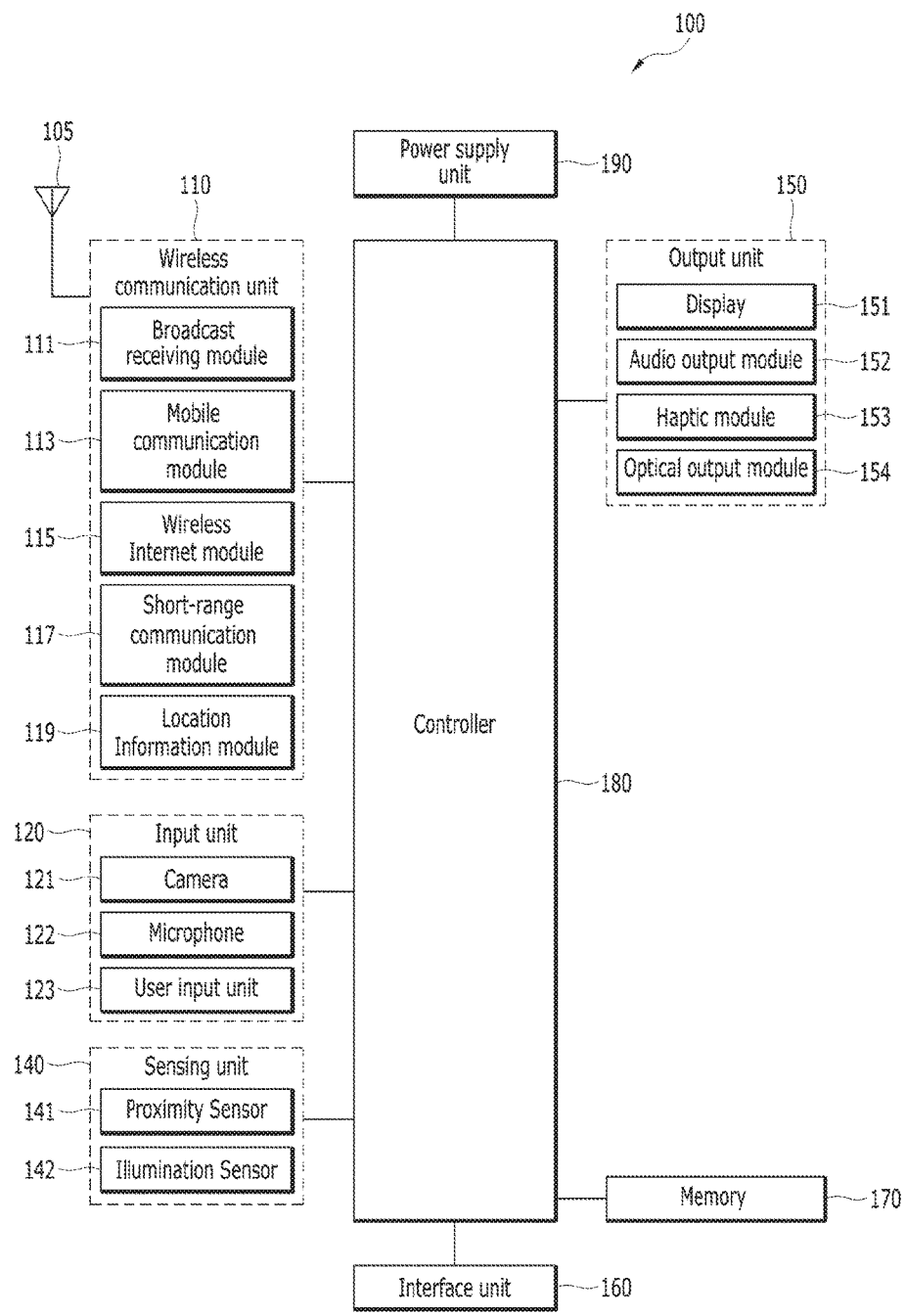
FIG. 1A is a block diagram to describe a mobile terminal related to the present invention.
Figure 1B:
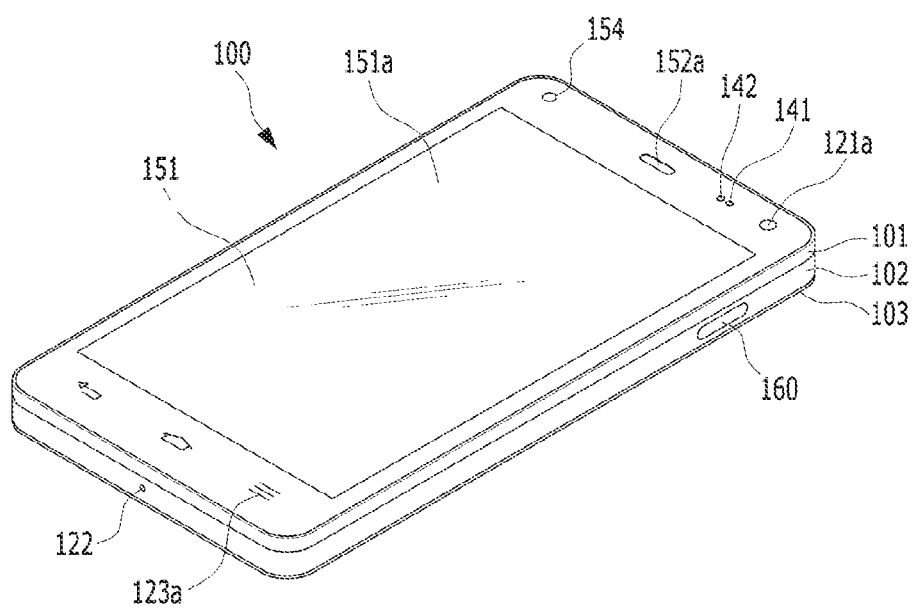
FIG. 1B and FIG. 1C are conceptual diagrams for one example of a mobile terminal related to the present invention, viewed in different directions.
Figure 1C:
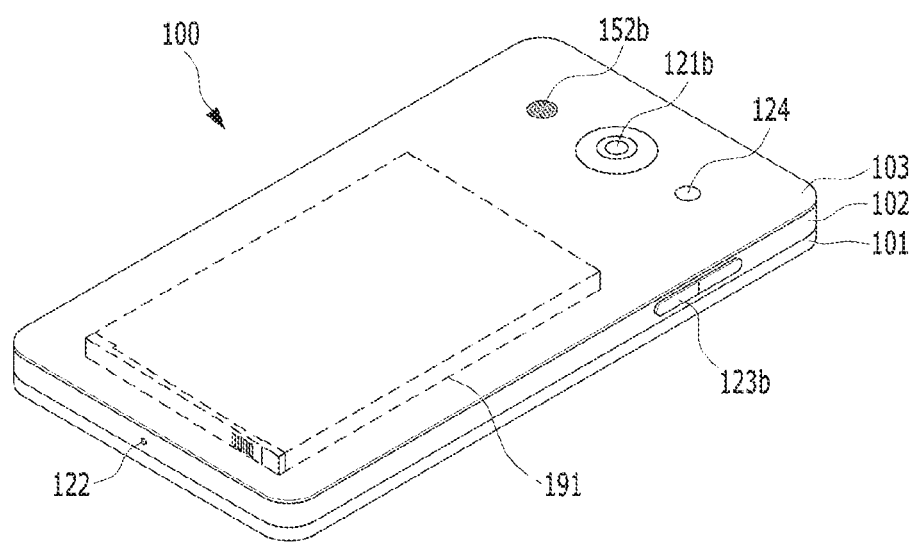

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components mentioned in the foregoing description can operate cooperatively to implement operations, controls or controlling methods of the mobile terminal according to various embodiments mentioned in the following description. Moreover, the operations, controls and controlling methods of the mobile terminal may be implemented on the mobile terminal by running or executing at least one application program saved in the memory 170.

Prior to looking into various embodiments implemented through the mobile terminal 100, the above-mentioned components will now be described in more detail with reference to FIG. 1A as follows.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In this case, the terminal body may be appreciated as a concept of regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, a $1^{st}$ audio output unit 152a, a $2^{nd}$ audio output unit 152b, a proximity sensor 141, an illumination sensor 142, an optical output unit 154, a $1^{st}$ camera 121a, a $2^{nd}$ camera 121b, a $1^{st}$ manipulation unit 123a, a $2^{nd}$ manipulation unit 123b, a microphone 122, an interface unit 160 and the like.

For the following description, as shown in FIG. 1B and FIG. 1C, the mobile terminal 100 having the following dispositions is taken as one example. First of all, the display unit 151, the $1^{st}$ audio output unit 152a, the proximity sensor 141, the illumination sensor 142, the optical output unit 154, the $1^{st}$ camera 121a and the $1^{st}$ manipulation unit 123a are disposed on a front side of the terminal body. Secondly, the $2^{nd}$ manipulation unit 123b, the microphone 122 and the interface unit 160 are disposed on a lateral side of the terminal body. Thirdly, the $2^{nd}$ audio output unit 152b and the $2^{nd}$ camera 121b are disposed on a rear side of the terminal body.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100.

As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
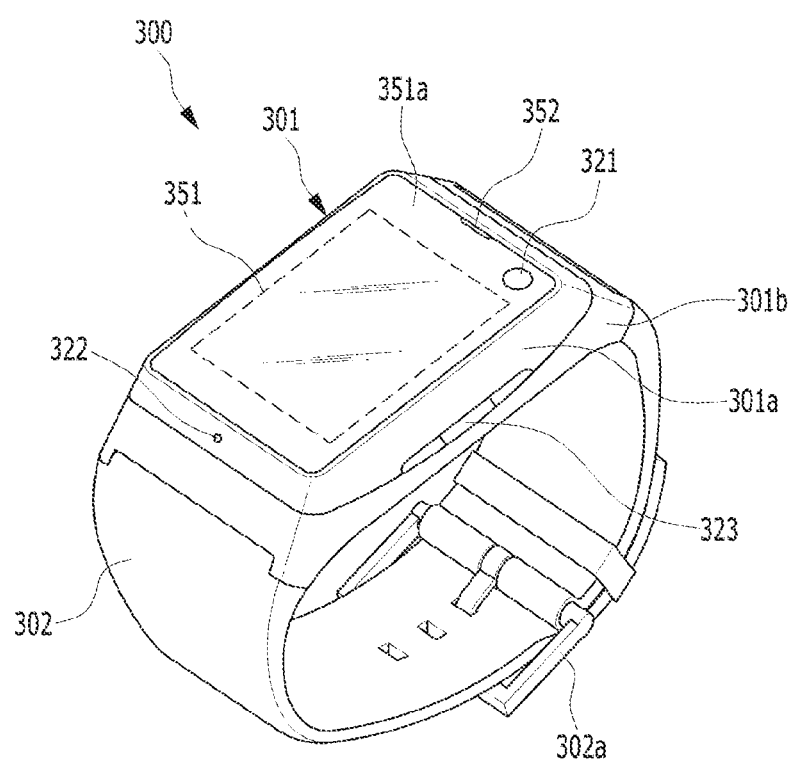
FIG. 2 is a perspective diagram showing one example of a watch type mobile terminal 300 (hereinafter named a watch terminal) related to another embodiment of the present invention.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment inclues audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Embodiments related to a control method that can be implemented in the above-configured mobile terminal shall be described in more detail with reference to the accompanying drawings. It is understood by those skilled in the art that the present features can be embodied in several forms without departing from the characteristics thereof.

Since a watch terminal 300 is worn on user's wrist, security of the watch terminal 300 can be regarded as high level. Until a band is unfastened at least, it is less probable that the watch terminal 300 is used by another person other than the user. One embodiment of the present invention intends to provide a method of utilizing a watch terminal 300 as an input means using relatively high security of the watch terminal 300. Particularly, it may be also possible to control another mobile terminal 100 linked to the watch terminal 300 as well as the watch terminal 300 itself.

Figure 3:
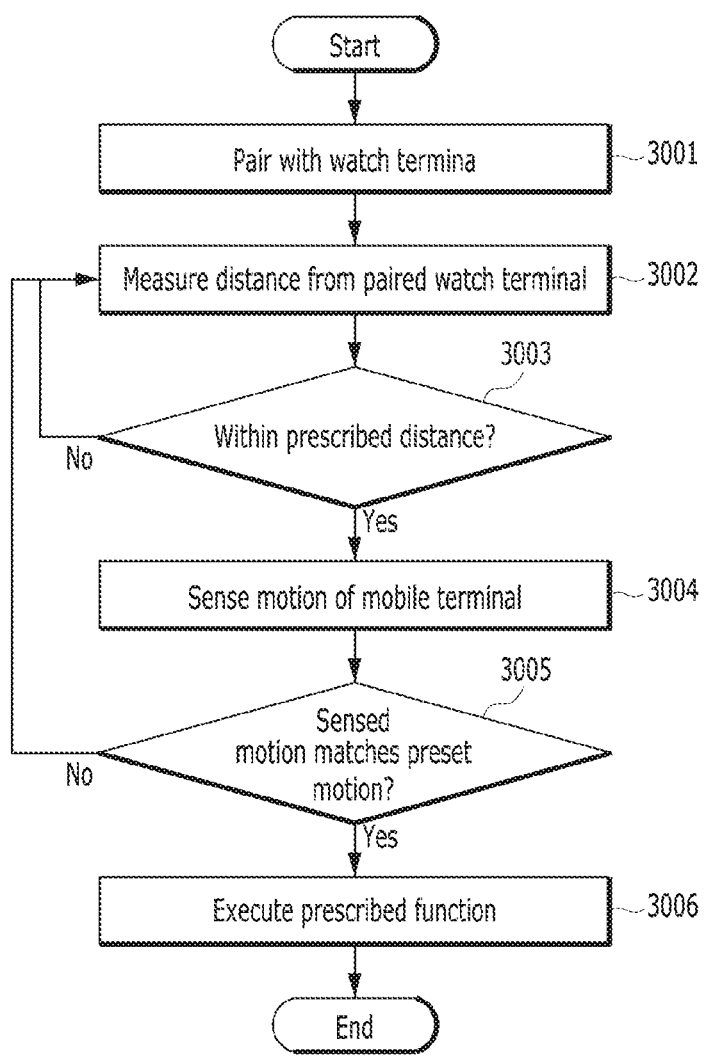
FIG. 3 is a flowchart for a control method of performing a function of a mobile terminal by paring (linking) a watch terminal and a mobile terminal with each other according to one embodiment of the present invention.

FIG. 3 is a flowchart for a control method of performing a function of a mobile terminal by paring (linking) a watch terminal and a mobile terminal with each other according to one embodiment of the present invention.

In one embodiment of the present invention described below, the watch terminal 300 and the mobile terminal 100 are assumed as paired with each other and a user is assumed as wearing the watch terminal 300 currently. Herein, 'pairing' means a state that a session is established by wire/wireless (e.g., Bluetooth, etc.) to enable the watch terminal 300 and the mobile terminal 100 to identify and transceive data with each other.

The controller 180 of the mobile terminal 100 performs pairing with the watch terminal 300 in a step 3001.

In a step 3002, the controller 180 measures a distance from the watch terminal 300 paired in the step 3001. Herein, if the pairing is established based on wireless communication, the distance measurement may be performed based on strength of transceived signals.

Assuming that a user wears the watch terminal 300 on user's wrist currently, if the distance between the watch terminal 300 and the mobile terminal 100 is close, the mobile terminal 100 may be regarded as possessed by a user or included in a use range of the user. If so, a security key necessary to enter a home screen, login information required for a specific homepage and the like may be omissible. Namely, according to one embodiment of the present invention, if the distance from the watch terminal 300 is close, it is proposed to automatically input various kinds of security key, login information and the like required for the use of the mobile terminal 100 by determining that it is the use by a rightful user.

Moreover, according to one embodiment of the present invention, user's rightful use is simply determined based on the distance between the watch terminal 300 and the mobile terminal. Besides such a method, one embodiment of the present invention may be applicable to various methods for sensing that the mobile terminal 100 is held in the hand having the watch terminal 300 worn thereon.

In a step 3003, the controller 180 determines whether the distance measured in the step 3002 is within a prescribed distance. If the distance is within the prescribed distance, the controller 180 may proceed to a step 3004 or go back to the step 3002.

According to one embodiment of the present invention, it is intended to propose a gesture of rotating the mobile terminal 100 as a user command for performing a prescribed function. Such a gesture is described in detail with reference to FIG. 4.

Figure 4:
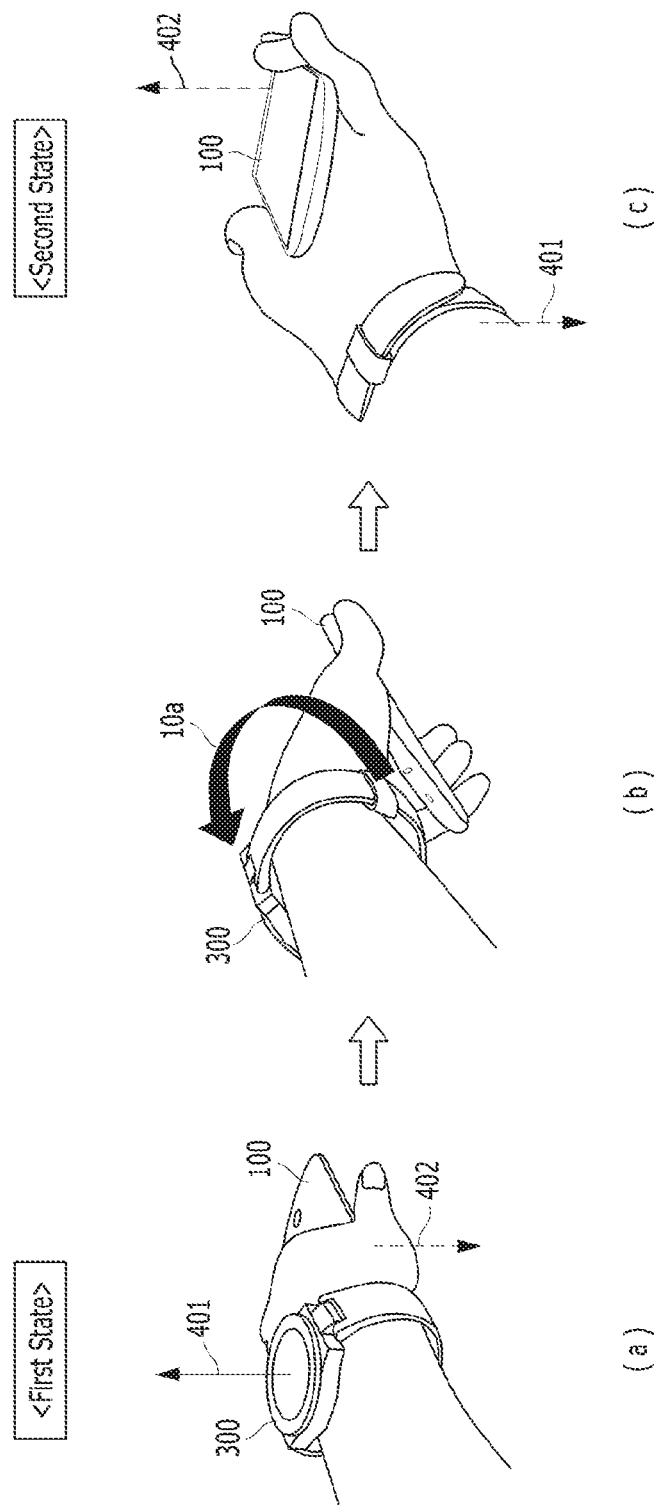
FIG. 4 is a diagram showing a gesture of rotating a mobile terminal 100 according to one embodiment of the present invention.

FIG. 4 is a diagram showing a gesture of rotating a mobile terminal 100 according to one embodiment of the present invention.

A gesture of rotating the mobile terminal 100 is assumed as performed in a state that the mobile terminal 100 is gripped by a hand having the watch terminal 300 worn thereon [cf. FIGS. 4(a) to 4(c)].

While a user wears the watch terminal 300 on a wrist, if the mobile terminal 100 is gripped, it is determined that it is within a prescribed distance in the step 3003, the routine may proceed to the step 3004.

FIG. 4(a) shows a first state of configuring a gesture. In the first state, a direction 402 of the touchscreen 151 of the mobile terminal 100 faces a ground direction and the display unit 351 of the watch terminal 300 faces a sky direction.

According to one embodiment of the present invention, it is intended to propose a gesture 10a of rotating a wrist to switch the first state shown in FIG. 4 (a) to a second state shown in FIG. 4(c) via an intermediate state (FIG. 4(b)). This gesture is similar to a gesture of starting an engine while the mobile terminal 100 is held like a vehicle key.

In the second state shown in FIG. 4(c), the direction 402 of the touchscreen 402 of the mobile terminal 100 faces the sky direction and the direction 401 of the display unit 351 of the watch terminal 300 faces the ground direction.

In the example shown in FIG. 4, described is the gesture 10a (hereinafter named a first rotation gesture) of rotation from the first state to the second state. On the contrary, it may be able to define a gesture (hereinafter named a second rotation gesture) of rotation from the second state to the first state.

Since the gesture is the gesture performed as if staring an engine, it may be meaningful in leading a user to an intuitive use. Since the display unit 351 of the watch terminal 300 faces the sky direction in the first state, the first state places emphasis on the use of the watch terminal 300. On the contrary, since the touchscreen 151 of the mobile terminal 100 faces the sky in the second state, the second state may place emphasis on the use of the mobile terminal 100. Hence, the gesture may have the meaning of switching a state depending on placing emphasis on the use of which terminal.

The following description shall be made with reference to the first state and the second state, and the switching between the two states may be performed by the gesture described in detail.

Referring now to FIG. 3, in a step 3004 and a step 3005, an operation of sensing the gesture is performed. Namely, in the step 3004, the controller 180 senses a motion of the mobile terminal 100. In the step 3005, if determining that the sensed motion matches a preset motion, the controller 180 may determine that the gesture is inputted by a user.

Namely, if the preset motion is matched in the step 3005, the routine may proceed to a step 3006 to perform a prescribed function. If the preset motion is not matched, the routine may go back to the step 3002.

Figure 5:
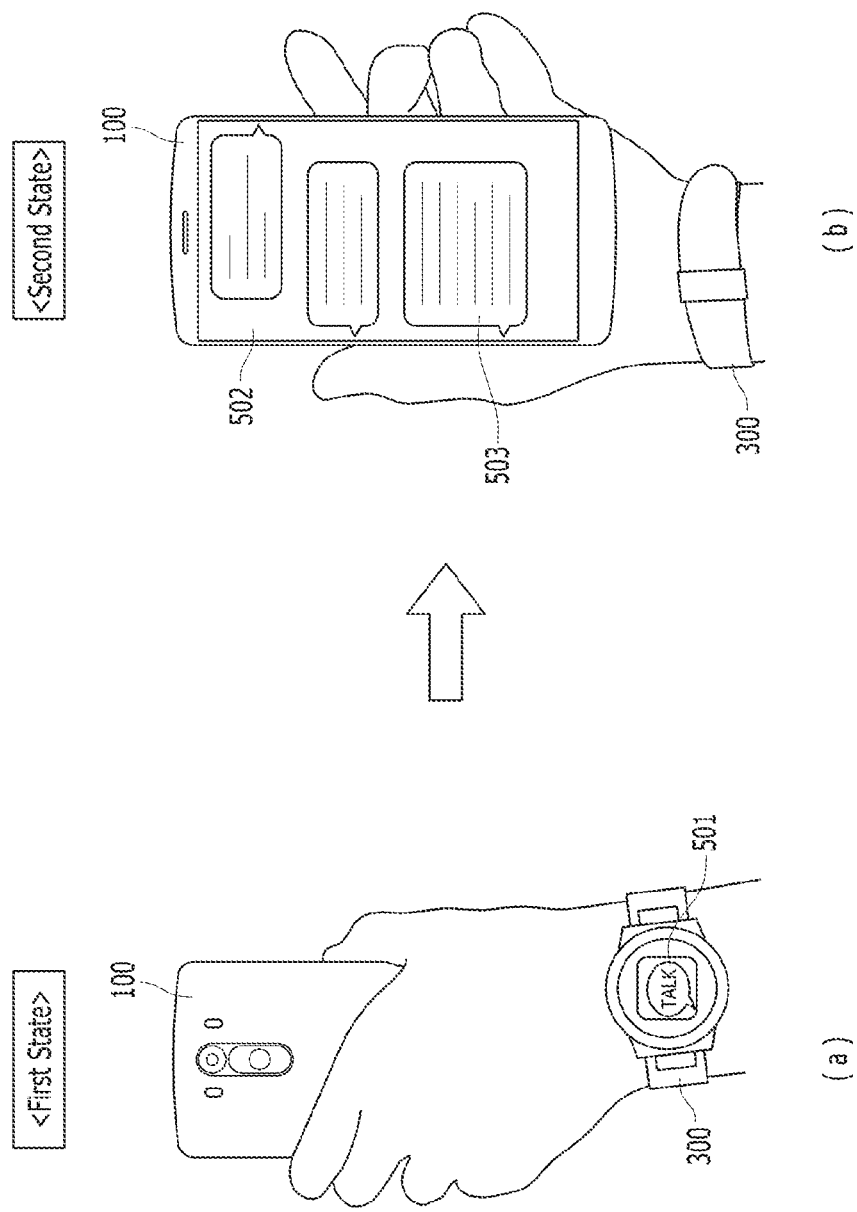
FIG. 5 is a diagram showing a control method of outputting detail information on a prescribed notification in response to a prescribed gesture according to one embodiment of the present invention.

FIG. 5 is a diagram showing a control method of outputting detail information on a prescribed notification in response to a prescribed gesture according to one embodiment of the present invention.

In the example related to FIG. 5, shown is a situation of receiving a message on a message application and outputting a notification of the reception.

Generally, security settings are enabled on a message transceiving application by a numerical password, a lock pattern and the like so as not to be exposed to other people except a user. Hence, in order to check a received message, it is necessary for a user to input a preset numerical password or a preset lock pattern as well. Yet, as described above, if the watch terminal 300 is already worn, it is not necessary for the security settings to be maintained. This is because the corresponding use can be regarded as user's own use.

Hence, according to one embodiment of the present invention, although the security settings enabled application is entered, if the first or second rotation gesture is sensed, it is proposed to automatically disable the security settings.

FIG. 5(a) shows a first state of the mobile terminal 100 and the watch terminal 300. A notification indicator 501 for a received message is outputted through the display unit 251 of the watch terminal 300.

Referring to FIG. 5(b), as the first rotation gesture 10a is received, if the first state is switched to the second state, the controller 180 outputs a running screen 502 of the message application and details 503 of the received message in order for the received message to be checked. In this case, a preset password, a preset lock pattern or the like on the message application may not be inputted.

Figure 6:
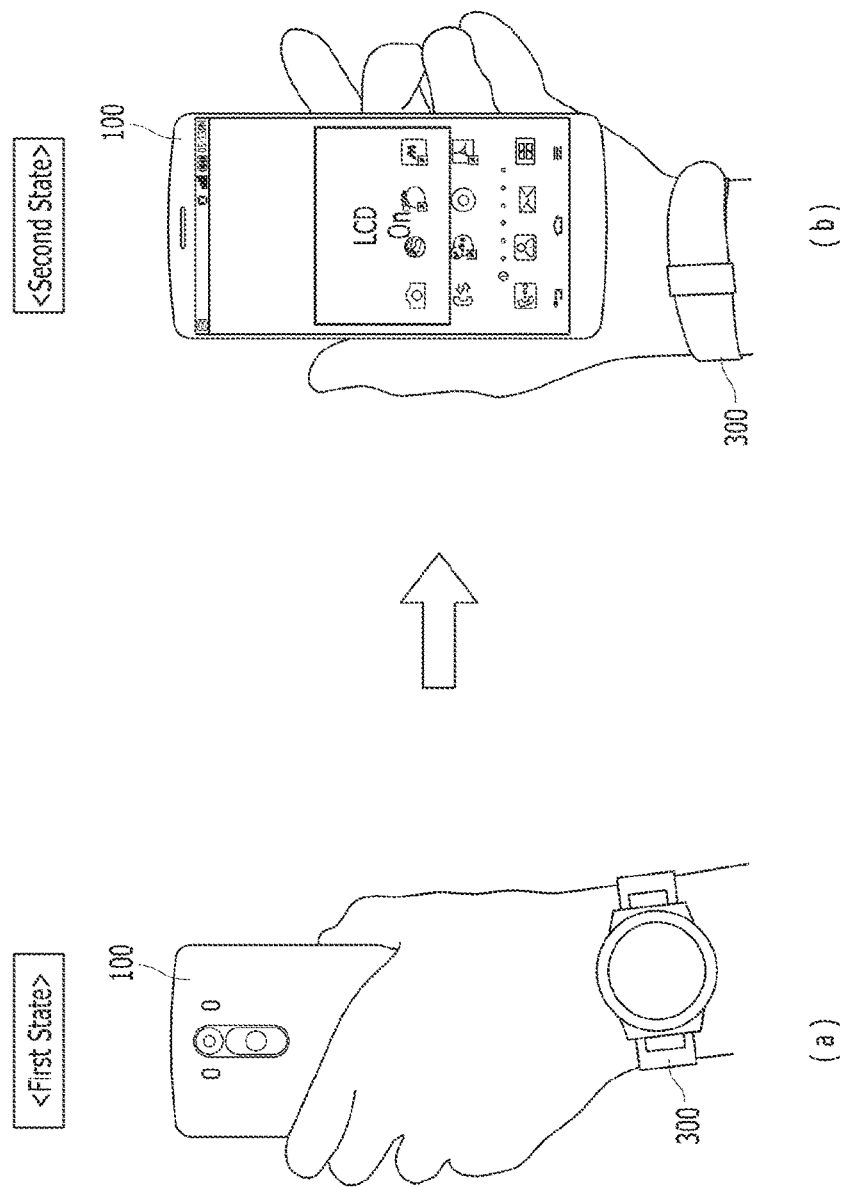
FIG. 6 is a diagram showing a control method of switching a touch screen 151 to activation if the touchscreen 151 is deactivated according to one embodiment of the present invention.

FIG. 6 is a diagram showing a control method of switching a touch screen 151 to activation if the touchscreen 151 is deactivated according to one embodiment of the present invention.

According to one embodiment of the present invention, it is proposed to switch the touchscreen to an activated state based on the aforementioned rotation gesture. Particularly, even if security settings are enabled by a password, a lock pattern or the like in entering a home screen, if the rotation gesture is received, the security settings may be automatically disabled.

Referring to FIG. 6(a), shown is a stat that the touchscreen 151 of the mobile terminal 100 is deactivated. If the first rotation gesture 10a is received, the controller 180 may automatically switch the touchscreen 151 to an activated state [cf. FIG. 6(b)].

Meanwhile, according to one embodiment of the present invention, if a home screen is entered through a rotation gesture, as shown in FIG. 6, it is proposed to switch to a user dedicated mode.

The user dedicated mode is a mode entered if user's own use is determined. And, the user dedicated mode may mean a mode to which all functions or authorities performed through the mobile terminal 100 are given. For instance, if the user dedicated mode is entered, security settings enabled photo/video can be viewed.

On the other hand, a normal mode is a mode entered if user's own use is not determined. The normal mode may mean a mode in which user's person contents, security settings enabled contents, or a use history cannot be checked.

An embodiment related to the above is described with reference to FIG. 7.

Figure 7:
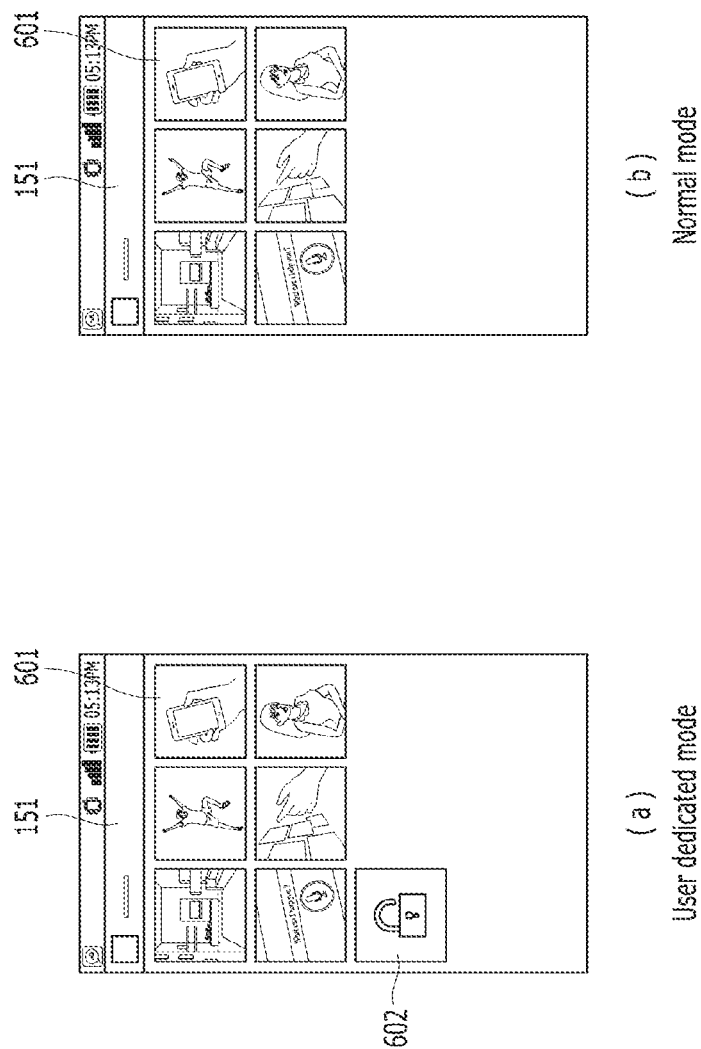
FIG. 7 is a diagram of comparing gallery application run state diagrams in user-dedicated mode and normal mode with each other according to one embodiment of the present invention.

FIG. 7 is a diagram of comparing gallery application run state diagrams in user-dedicated mode and normal mode with each other according to one embodiment of the present invention.

According to one embodiment of the present invention described in FIG. 7, a security setting enabled photo/video can be read/viewed only if the user dedicated mode is entered.

FIG. 7(a) shows a running state diagram of a gallery application in user dedicated mode. Referring to FIG. 7(a), the controller 180 is outputting a thumbnail list 601. And, an item of security settings enabled photo/video 602 is included in the thumbnail list 601. If an input of selecting the item of the security settings enabled photo/video 602 is received, the controller 180 may output a detailed screen of the security settings enabled photo/video 602.

FIG. 7(b) shows a running state diagram of a gallery application in normal mode. Referring to FIG. 7(b), the controller 180 may output the thumbnail list 601 in a manner of hiding the item of the security settings enabled photo/video 602 that can be checked in FIG. 7(a). Namely, the security setting enabled photo/video readable or viewable in the user dedicated mode cannot be read/viewed in the normal mode.

In the embodiment related to FIG. 7, as a target of security settings, such a content as photo/video is described for example. In the following description with reference to FIG. 8, an example of user's personal use history (item on a recently run application list) is described.

Figure 8:
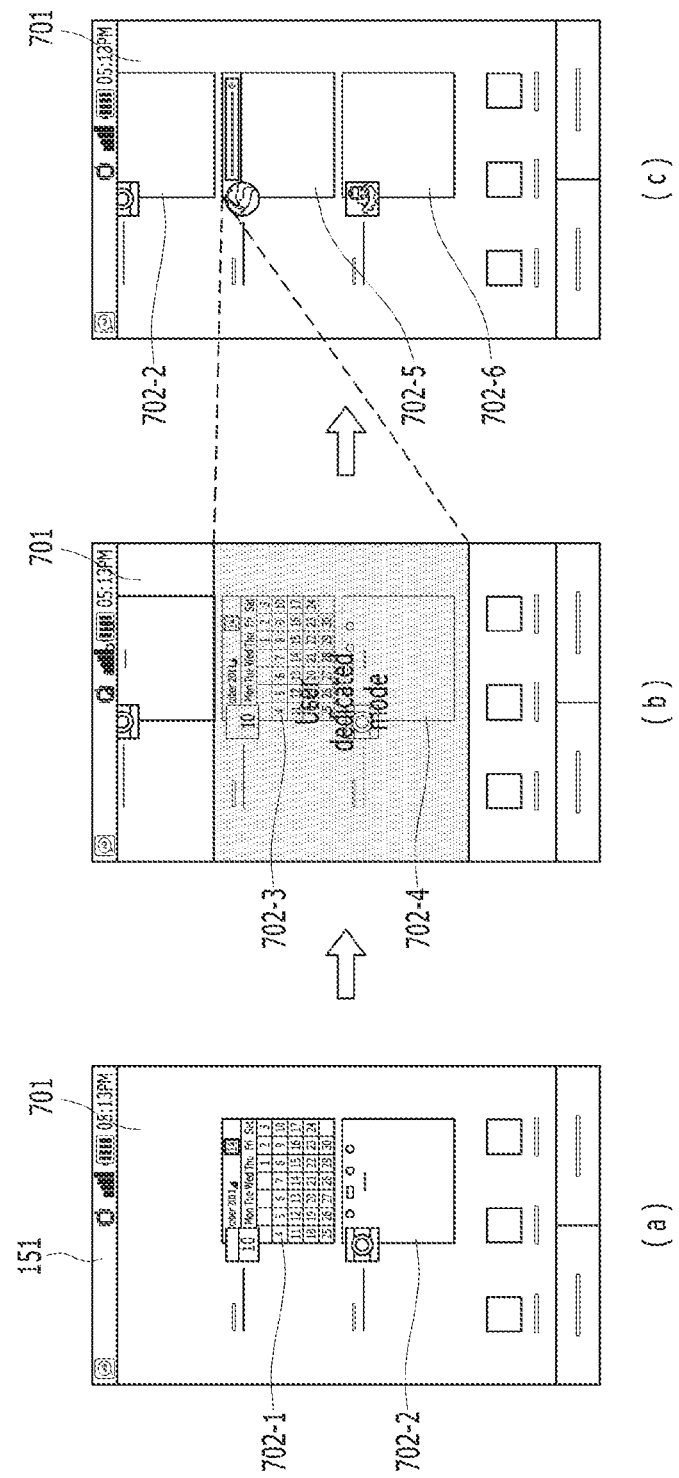
FIG. 8 is a diagram showing a difference between user-dedicated mode and normal mode in outputting a recently run application list according to one embodiment of the present invention.

FIG. 8 is a diagram showing a difference between user-dedicated mode and normal mode in outputting a recently run application list according to one embodiment of the present invention.

In the embodiment related to FIG. 8, while a user dedicated mode is entered, even if a prescribed application is run, it is proposed that a run history of the application cannot be checked in normal mode. Namely, application items outputted on a recently run application list in normal mode may not include an application previously run in user dedicated mode. Security settings are automatically enabled on the item of the application previously run in the user dedicated mode.

Referring to FIG. 8(a), a recently run application list 701 is currently outputted through the touchscreen 151. And, a first item 702-1 and a second item 702-2 are outputted on the recently run application list 701. Herein, the first and second items 702-1 and 702-2 are assumed as items for the applications run in normal mode.

Subsequently, after the user dedicated mode has been entered, assume that two applications are additionally run. Referring to FIG. 8(b), it can be observed that third and fourth items 702-3 and 702-4 for applications run in the user dedicated mode are outputted on the recently run application list 701.

Referring to the state diagram of entering the normal mode in FIG. 8 (c), the controller 180 does not output the third and fourth items 702-3 and 702-4 but may output the second, fifth and sixth items 702-2, 702-5 and 702-6 for applications run in the normal mode.

Meanwhile, according to another embodiment of the present invention, if user's login information for a webpage, an SNS application or the like is required, it is proposed to automatically input pre-saved login information using the rotation gesture.

Figure 9:
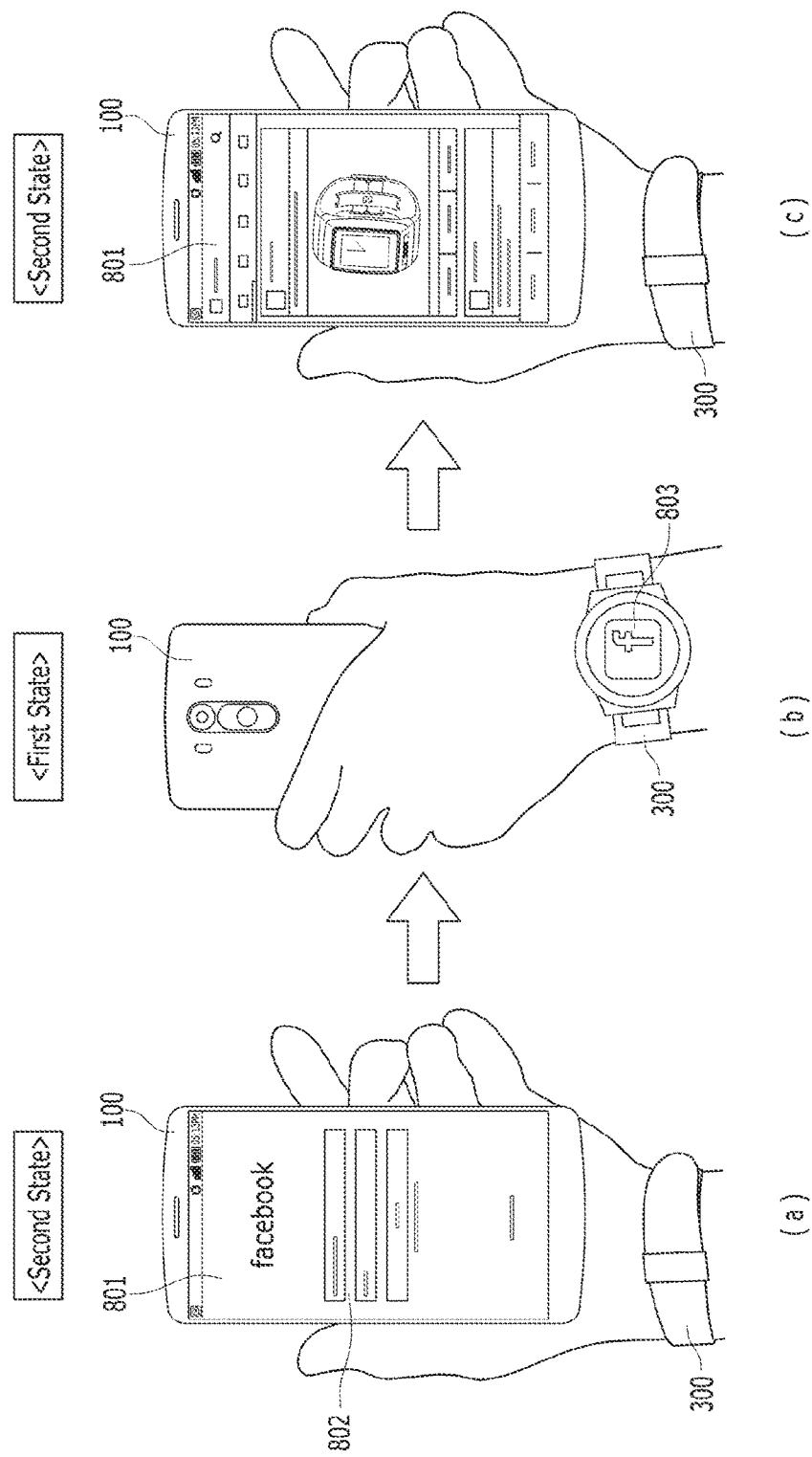
FIG. 9 is a diagram showing a control method of automatically inputting login information according to one embodiment of the present invention.

FIG. 9 is a diagram showing a control method of automatically inputting login information according to one embodiment of the present invention.

Referring to FIG. 9(a), through a running screen 801 of a web browser application, a prescribed login screen 802 is outputted. In this case, assume that the mobile terminal 100 and the watch terminal 300 are in the second state.

Referring to FIG. 9(b), if the second rotation gesture 10b of switching the second state to the first state is inputted, the controller 180 may control a lock indicator 803 to be outputted on the display unit 351 of the watch terminal 300.

If the first rotation gesture 10a is inputted again, the controller 180 automatically inputs login information to the login screen 802 and is able to output the running screen 801 [FIG. 9(c)].

The login information may include information previously stored in the mobile terminal 100. Particularly, since login information may differ per webpage, login information can be saved per webpage. And, the controller 180 may input login information corresponding to a webpage in case of an input of login information.

Namely, a user can advantageously input login information with ease through a rotation gesture only.

In the following, a control method of easily controlling screen brightness using a gesture is described.

Figure 10:
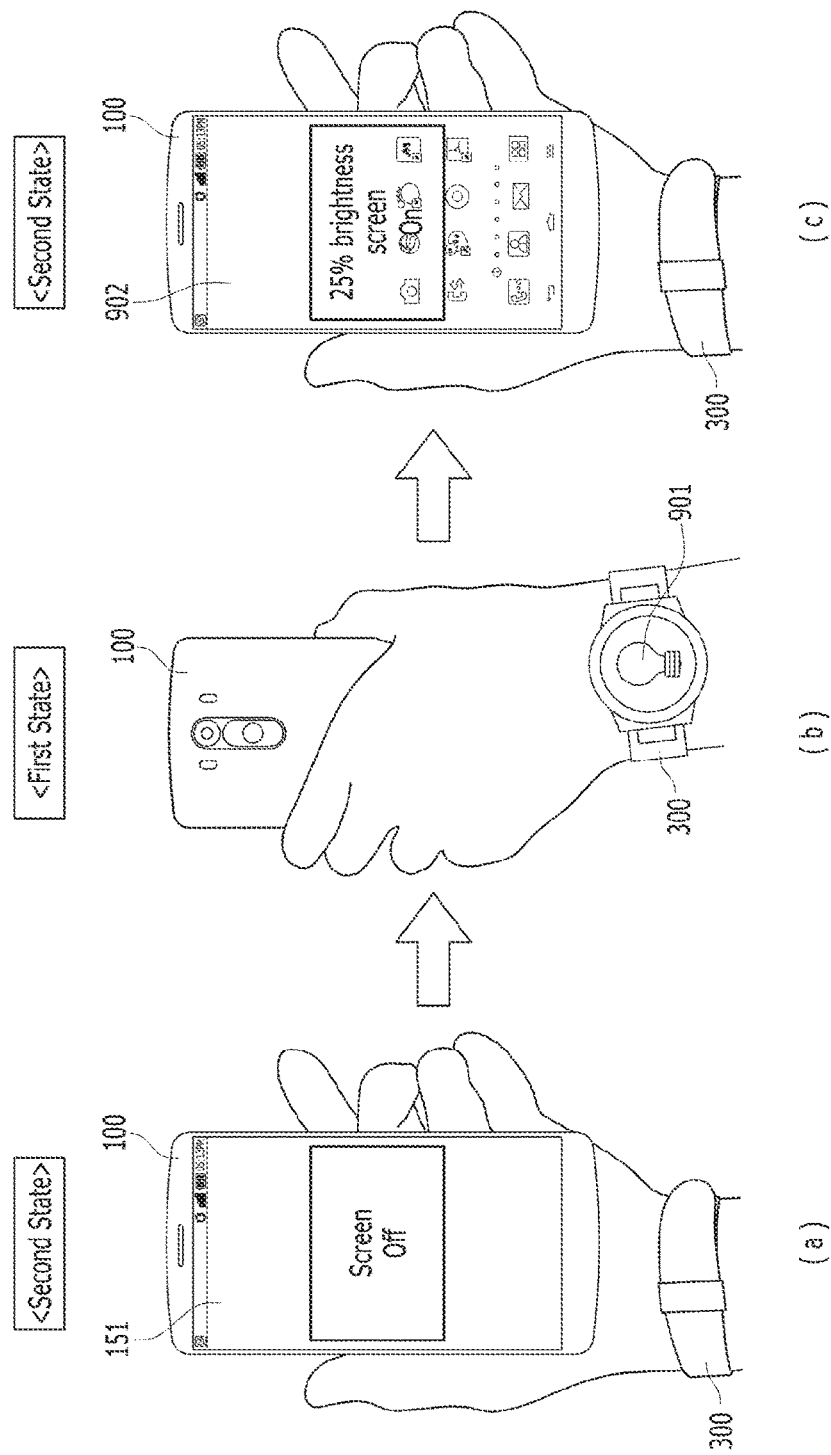
FIG. 10 is a diagram to describe a control method of releasing a lock screen by facilitating a control of screen brightness according to one embodiment of the present invention.

FIG. 10 is a diagram to describe a control method of releasing a lock screen by facilitating a control of screen brightness according to one embodiment of the present invention.

Generally, a control of screen brightness may be performed in a manner of activating the touchscreen 151 in preset brightness and then using a brightness control screen outputted through the activated touchscreen 151. Yet, before activating a screen, it is necessary to adjust brightness. For instance, in order to avoid interrupting another person's movie appreciation in a theater, it may be intended to activate a screen in low brightness.

Therefore, according to one embodiment of the present invention, proposed is a control method for setting screen brightness in advance through a rotation gesture before activation of a screen of the touchscreen 151.

FIG. 10(a) shows a state that a screen of the touchscreen 151 is deactivated in the second state. If the second rotation gesture 10b for switching the second state to the first state is received, the controller 180 may output a screen brightness control indicator 901 through the display unit 251 of the watch terminal 300.

Figure 11:
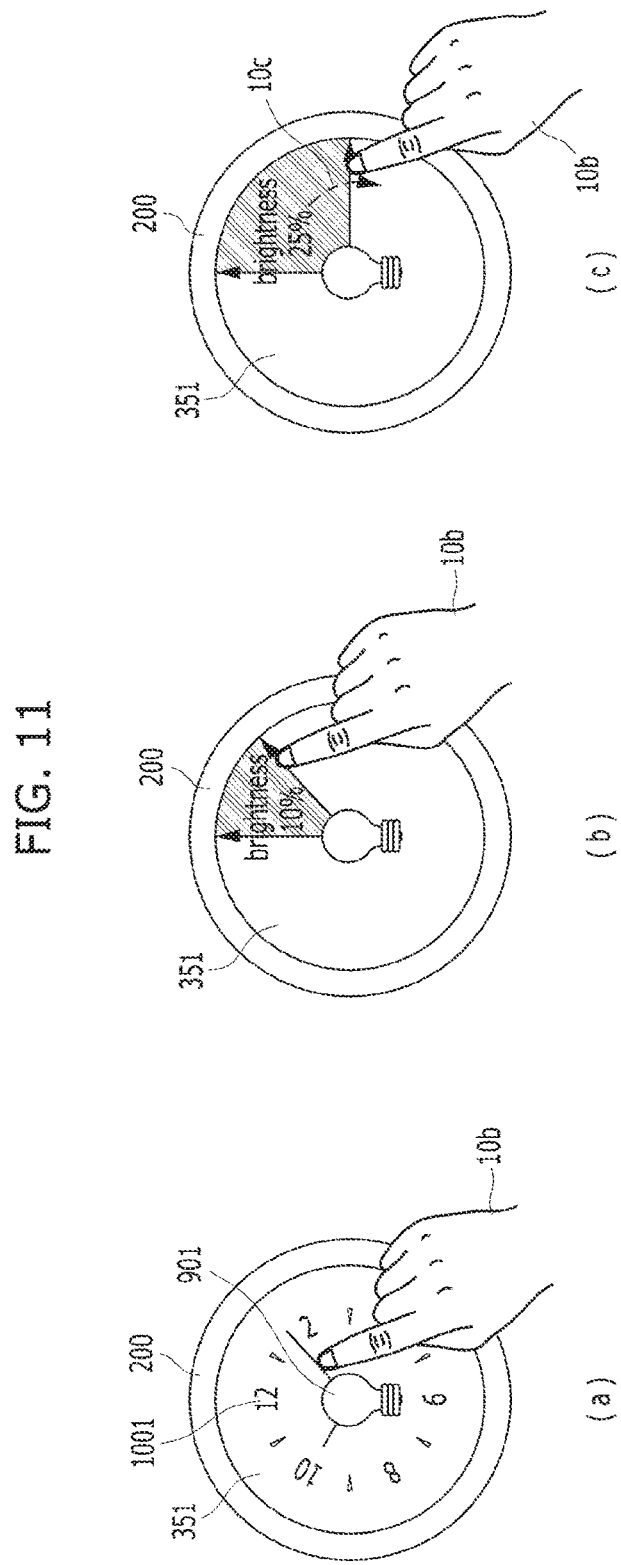
FIG. 11 is a diagram showing a method of controlling brightness through a screen brightness control indicator 901 according to one embodiment of the present invention.

FIG. 11 is a diagram showing a method of controlling brightness through a screen brightness control indicator 901 according to one embodiment of the present invention.

Referring to FIG. 11(a), a dial plate and a brightness control indicator 901 are outputted through the display unit 351.

Referring to FIG. 11(b), if a touch 10b is applied to the dial plate, a preset brightness numerical value may be outputted.

If an input 10c of maintaining the touch 10b and then dragging the touch 10b clockwise or counterclockwise is received, as shown in FIG. 11(c), brightness may be controlled up or down in proportion to a dragging distance.

Meanwhile, a brightness control method itself does not restrict one embodiment of the present invention, and other methods for controlling brightness may be combined with one embodiment of the present invention.

Assuming that the brightness numerical value is set to 25% by the control method shown in FIG. 11, the embodiment shown in FIG. 10 is referred to again.

If the first rotation gesture 10a of switching FIG. 10(b) to FIG. 10(c) is received, the controller 180 may activate the screen of the touchscreen 151 at the brightness numerical value of 20% set in FIG. 11. Hence, a user can advantageously activate the screen at the brightness numerical value directly set by the user instead of a preset brightness numerical value.

A control method of setting a bookmark during a video play is described with reference to FIG. 12 and FIG. 13 as follows.

Figure 12:
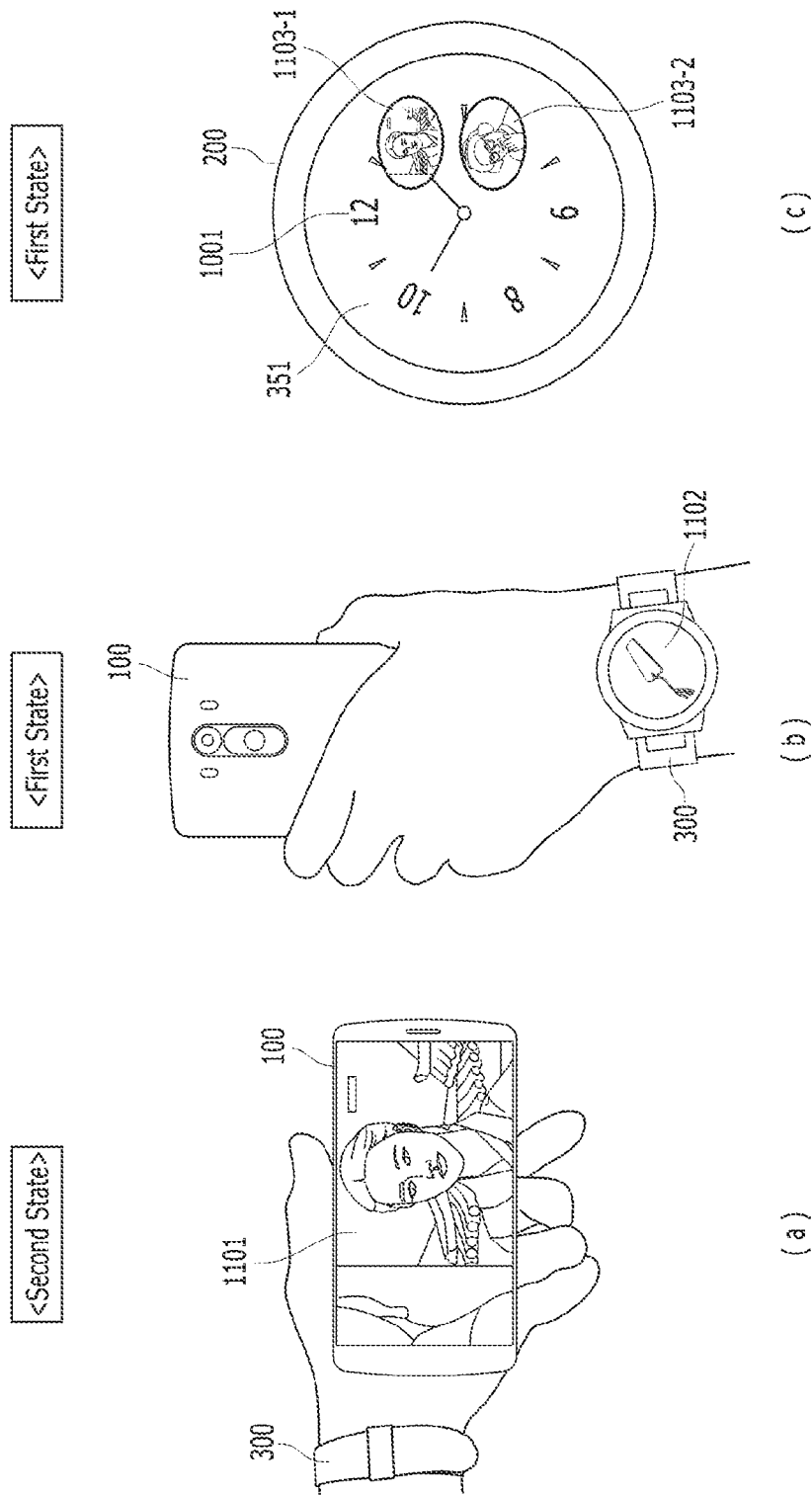
FIG. 12 and FIG. 13 are diagrams showing a control method of setting a video play bookmark according to one embodiment of the present invention.
Figure 13:
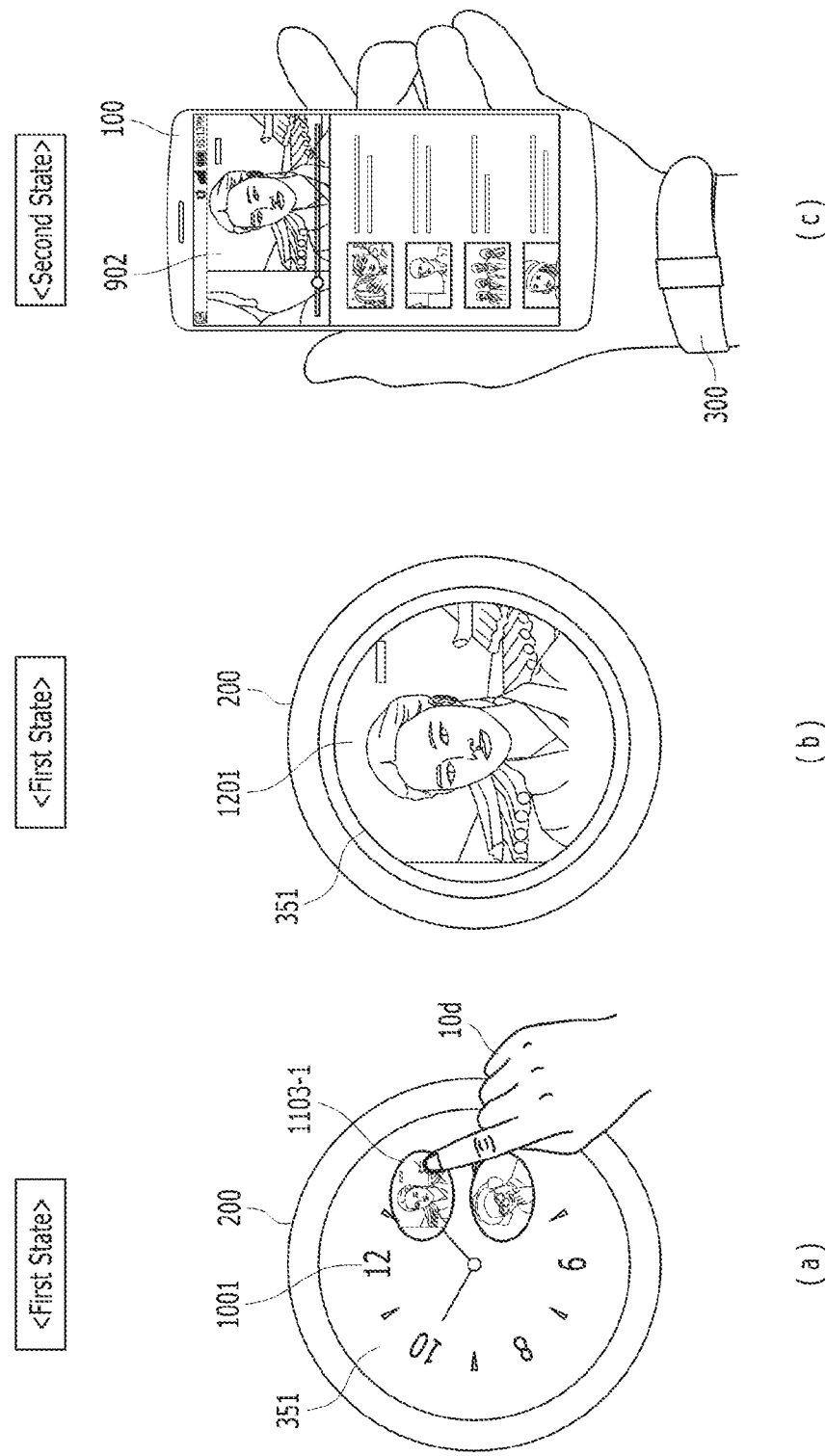

FIG. 12 and FIG. 13 are diagrams showing a control method of setting a video play bookmark according to one embodiment of the present invention.

Referring to FIG. 12(a), the controller 180 is outputting a video play screen 1101 through the touchscreen 151 and the second state is illustrated.

Referring to FIG. 12(b), if the second rotation gesture 10b of switching the second state to the first state is inputted, the controller 180 may save information on a timing point of the corresponding play and output a bookmark indicator 1102 through the display unit 351.

Particularly, referring to FIG. 12(*c*), according to one embodiment of the present invention, it is proposed to further output previews 1103-1 and 1103-2 of the timing point of the play to a dial plate 1001 of the watch terminal 300.

Referring to FIG. 13(*a*), if a prescribed preview 1103-1 is selected 10*d*, the preview 1103-1 may be outputted to the display unit 351 of the watch terminal 300 in a manner of being enlarged [FIG. 13(*b*)].

Subsequently, if the first rotation gesture 10*a* is inputted, as shown in FIG. 13(*c*), a play screen 902 from the corresponding play timing point may be outputted through the touchscreen 151.

The above-described methods can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A mobile terminal, comprising:
   a touchscreen configured to display information;
   a sensing unit configured to sense motion of the mobile terminal;
   a wireless communication unit configured to receive wireless signals; and
   a controller configured to:
   control the wireless communication unit to receive a wireless signal from an external terminal;
   determine a distance from the mobile terminal to the external terminal based on strength of the received wireless signal;
   perform a specific function when the sensed motion corresponds to a specific motion and the determined distance is within a specific range the specific function comprising:
   controlling the touchscreen to display an execution screen of an application in response to sensing a first motion that includes rotating the mobile terminal from a first position to a second position; and
   causing the external terminal to display an indicator related to the application in response to sensing a second motion that includes rotating the mobile terminal from the second position to the first position.

2. The mobile terminal of claim 1, wherein the controller is further configured to:
   control the wireless communication unit to receive motion information related to the external terminal; and
   perform the specific function only when the sensed motion and the received motion information correspond to the specific motion and the determined distance is within the specific range.

3. The mobile terminal of claim 1, further comprising a touchscreen wherein:
   the sensing unit is further configured to sense a first direction faced by the touchscreen; and
   the motion comprises rotating the touchscreen from the first direction to a second direction.

4. The mobile terminal of claim 3, wherein:
   the first direction is a direction in which the touchscreen faces downward; and
   the second direction is a direction in which the touchscreen faces upward.

5. The mobile terminal of claim 1, wherein the specific function further comprises controlling the touchscreen to switch from a deactivated state to an activated state.

6. The mobile terminal of claim 1, wherein the specific function further comprises disabling a security enabled application.

7. The mobile terminal of claim 1, wherein the specific function further comprises automatically entering login information to a webpage.

8. The mobile terminal of claim 1, further comprising a camera, wherein the specific function further comprises enabling a security attribute for a photo captured via the camera.

9. The mobile terminal of claim 1, wherein the specific function further comprises entering a mode for viewing a security enabled photo.

10. The mobile terminal of claim 1, wherein the specific function further comprises controlling the touchscreen to display a notification.

11. A method of controlling a mobile terminal, the method comprising:
    determining motion of the mobile terminal;
    receiving a wireless signal from an external terminal;
    determining a distance from the mobile terminal to the external terminal based on strength of the received wireless signal;
    performing a specific function when the sensed motion corresponds to a specific motion and the determined distance is within a specific range the specific function comprising:
    displaying a execution screen of an application in response to sensing a first motion that includes rotating the mobile terminal from a first position to a second position; and
    causing the external terminal to display an indicator related to the application in response to sensing a second motion that includes rotating the mobile terminal from the second position to the first position.

12. The method of claim 11, further comprising:
    receiving motion information related to the external terminal; and
    performing the specific function only when the sensed motion and the received motion information correspond to the specific motion and the determined distance is within the specific range.

13. The method of claim 11, further comprising sensing a first direction faced by a touchscreen of the mobile terminal, wherein the motion comprises rotating the touchscreen from the first direction to a second direction.

14. The method of claim 13, wherein:
    the first direction is a direction in which the touchscreen faces downward; and
    the second direction is a direction in which the touchscreen faces upward.

15. The method of claim 11, wherein the specific function further comprises switching a touchscreen of the mobile terminal from a deactivated state to an activated state.

16. The method of claim 11, wherein the specific function further comprises disabling a security enabled application.

17. The method of claim 11, wherein the specific function further comprises automatically entering information to a webpage.

18. The method of claim 11, wherein the specific function further comprises enabling a security attribute for a captured photo.

19. The method of claim 11, wherein the specific function further comprises entering a mode for viewing a security enabled photo.

20. The method of claim 11, wherein the specific function further comprises displaying a notification.

* * * * *